US012572032B2

(12) United States Patent
Webb

(10) Patent No.: US 12,572,032 B2
(45) Date of Patent: Mar. 10, 2026

(54) INVISIBLE EDGE LENS

(71) Applicants:Graeme Stowell, Mountain Creek
(AU); Anthony Webb, Runaway Bay
(AU)

(72) Inventor: Anthony Webb, Runaway Bay (AU)

(73) Assignees: Graeme Stowell, Mountain Creek
(AU); Anthony Webb, Runaway Bay
(AU)

( * ) Notice: Subject to any disclaimer, the term of this
patent is extended or adjusted under 35
U.S.C. 154(b) by 317 days.

(21) Appl. No.: 18/577,879

(22) PCT Filed: Jul. 8, 2022

(86) PCT No.: PCT/AU2022/050722
§ 371 (c)(1),
(2) Date: Jan. 9, 2024

(87) PCT Pub. No.: WO2023/279173
PCT Pub. Date: Jan. 12, 2023

(65) Prior Publication Data
US 2024/0361613 A1 Oct. 31, 2024

(30) Foreign Application Priority Data

Jul. 9, 2021 (AU) ................................ 2021902108
Jul. 19, 2021 (AU) ................................ 2021902219

(51) Int. Cl.
G02C 7/00 (2006.01)
A61F 9/02 (2006.01)
(Continued)

(52) U.S. Cl.
CPC ............. G02C 7/022 (2013.01); G02C 7/108
(2013.01)

(58) Field of Classification Search
CPC ......... A61B 3/02; A61B 3/102; A61B 3/1025;
A61B 3/1015; A61B 3/024; A61F 9/026;
(Continued)

(56) References Cited

U.S. PATENT DOCUMENTS

| | | | |
|---|---|---|---|
| 5,755,786 A | 5/1998 | Woffinden et al. | |
| 10,078,230 B2 | 9/2018 | Jiang | |
| 2008/0024716 A1 | 1/2008 | Reichow et al. | |

FOREIGN PATENT DOCUMENTS

WO 2002037169 A1 5/2002

OTHER PUBLICATIONS

International Search Report for International Application No. PCT/
AU2022/050722 of Sep. 7, 2022.
(Continued)

*Primary Examiner* — Dawayne Pinkney
(74) *Attorney, Agent, or Firm* — Perilla Knox &
Hildebrandt LLP; Kenneth A. Knox

(57) ABSTRACT
There is provided a lens for use in frame-less spectacles, the
lens body comprising an essentially flat angled peripheral
edge joining inner and outer peripheral rims; the angled
peripheral rim having an internal surface inside the lens
body and an external surface defining an outside of the lens
body. A junction between the angled peripheral edge and the
inner lens surface forms a cleanly machined vertex at the
inner peripheral rim. A junction of the angled peripheral
edge and the outer lens surface forms a vertex sufficiently
radiused to remove a sharp edge at the outer peripheral rim.
An invisible zone is created between the lines of sight P that
pass the inner peripheral rim, and the lines of sight P1
refracted at the peripheral rim through the lens. In use, the
internal surface and external surface of the angled peripheral
edge of the lens body and the outer peripheral rim are within
the invisible zone and are therefore not visible to the user.

20 Claims, 1 Drawing Sheet

ELEVATION

(51) Int. Cl.
  *G02C 1/02* (2006.01)
  *G02C 7/02* (2006.01)
  *G02C 7/10* (2006.01)

(58) Field of Classification Search
  CPC .......... G02C 7/024; G02C 5/128; G02C 5/02;
    G02C 1/02; G02C 7/00; G02C 7/02
  USPC .......... 351/159.01, 200, 205, 206, 209, 210,
    351/222, 223, 41, 64, 65, 100, 159.52,
    351/159.73–159.77
  See application file for complete search history.

(56) References Cited

OTHER PUBLICATIONS

Written Opinion for International Application No. PCT/AU2022/050722 of Sep. 7, 2022.

ELEVATION

INVISIBLE EDGE LENS

CROSS-REFERENCE TO RELATED APPLICATIONS

The present document is a national phase application under 35 U.S.C. § 371 of PCT/AU2022/050722 filed 8 Jul. 2022, which claims the benefit of and priority from AU 2021902108 entitled Invisible Edge Lens, filed on 9 Jul. 2021, and AU2021902219 entitled Invisible Edge Lens, filed on 19 Jul. 2021; the present document is further related to AU2022202255 filed on 5 Apr. 2022 entitled Invisible Edge Lens, the entire contents of each of which are hereby incorporated in their entirety by reference.

TECHNICAL FIELD

The present invention relates to lenses used to modify vision. In an embodiment, the eyeglass lenses are intended for use in frameless spectacles.

BACKGROUND

It is estimated that about 75% of people will require some form of vision correction in their lifetime. A commonly used form of vision modification is a pair of spectacles or glasses worn in front of the eyes, supported by a frame resting on the ears and nose. Some glasses have frames covering the entire periphery of the lenses. These frames add weight and are visible to the wearer and onlookers.

Alternatively, glasses can have a frame partially covering the edge of the lens, which may be supported by a nylon filament attached to the frame for a more discrete look. Some persons prefer to wear 'frame-less' or 'rimless' glasses, with the lens not bounded by any frame, to minimise the appearance of wearing spectacles. However, these frame-less glasses still present the wearer with the distraction of a visible lens edge. This appears as a dark or grey partial ring in their peripheral vision or a ring of reflected light, both of which vary continuously according to lighting conditions. This effect interrupts the continuity of the scene being viewed, in contrast to the view experienced by the person without glasses. The edge visibility continually reminds the wearer that they are wearing glasses. In the case of playing sports or other activity requiring an uninterrupted field of view, this distraction is especially annoying.

Accordingly, there exists a need for a lens for use in frame-less glasses or spectacles that in embodiments improves the user experience.

SUMMARY OF INVENTION

According to a first aspect of the invention there is provided a lens for use in frame-less spectacles for a user having an eye with a line of sight along an axis S (S being straight ahead) which is about 0 degrees when the user is looking directly ahead, and peripheral lines of sight P, the lens comprising a lens body, the lens body having:

an inner lens surface closest to the eye, having an inner peripheral rim; and an outer lens surface bounded by an outer peripheral rim, the inner lens surface can be described as concave and the outer lens surface can be described as convex;

an angled peripheral edge joining the inner peripheral rim and outer peripheral rim, the angled peripheral edge having an internal surface inside the lens body and an external surface defining an outside of the lens body;

the angled peripheral edge can be described as essentially flat as viewed from a user's pupil;

a junction between the angled peripheral edge and the inner lens surface forms a cleanly machined vertex at the inner peripheral rim; and a junction of the angled peripheral edge and the outer lens surface forms a vertex sufficiently radiused to remove a sharp edge at the outer peripheral rim;

an invisible zone created between the lines of sight P that pass the inner peripheral rim, and the lines of sight P1 refracted at the peripheral rim through the lens, wherein in use the angled peripheral edge is disposed completely within the invisible zone such that any lines of sight P that pass the inner peripheral rim do not strike the external surface of the angled peripheral edge nor the outer peripheral rim; and refracted lines of sight P1 within the lens body do not strike the internal surface of the angled peripheral edge nor the outer peripheral rim, such that the internal surface and external surface of the angled peripheral edge and outer peripheral rim are not visible to the user in use.

In the present lens, the angle of the angled peripheral edge is always greater than the refracted lines of sight P1, but less than peripheral lines of sight P so the external edge surface and internal edge surface inside the lens body, and outer peripheral rim are not visible to the user in use.

Thus, there is disclosed a lens design having an inner lens surface closest to the eye with an inner peripheral rim, and an outer opposing lens surface with an outer peripheral rim, which is the boundary of the lens material. The two rims are formed by the respective intersections of the lens' inner and outer surfaces with a machined edge (angled lens edge) at the extremity of the lens' perimeter.

The angled peripheral edge around the lens' perimeter is machined at an angle that is calculated to keep the angled peripheral lens edge concealed from the user's peripheral and direct vision at all angles of natural eye movement in use. The angle is always within a sector created between lines of sight passing the inner peripheral rim and those refracted at the inner peripheral rim (the invisible zone). The angle of the angled peripheral edge may bisect this invisible zone sector, but the angle may be varied in either direction towards the outer boundaries of the invisible zone to maximize optical advantage or minimize lens material used.

The angled peripheral lens edge may be around the entire periphery of the lens. In a preferred embodiment, the angled peripheral lens edge is around the entire periphery of the lens. The angled peripheral edge can be essentially flat relative to radial lines of sight from a user's eye. The angled edge occupies the entire thickness of a lens edge.

Any transparent material has an internal surface and external surface at the boundary, both of which are reflective and thus visible in various light conditions. The said angled peripheral lens edge has an internal surface inside the lens body that is bounded by the lens material on the inside. The said angled peripheral lens edge has an external surface defining an outside edge of the lens body, which is bounded by the atmosphere on the outside. In frame-less lenses machined in the conventional way, the lens edge is visible to both onlookers and to the wearer, whether it is polished to a clear finish or not.

An aim of the present invention is to combine characteristics of the human eye with a new lens design to improve the user experience by eliminating lens edge visibility and reflections in even the most extreme lighting conditions, e.g. direct sunlight or viewing bright and moving lights when the wearer is in a dark environment, such as when driving at night. In these conditions, in embodiments, zero reflections or stray light are noticeable to the user in the lens edge.

In embodiments, the lens is, by its nature, light weight, and can feature a frame attachment system which may also be light weight and barely visible to the wearer in use. This, in combination with the invisible lens edges creates, in embodiments, a user experience as close as possible to that of not wearing spectacles.

The angled peripheral lens edge has an internal and external surface. Light and images can be reflected from both of these internal and external surfaces, making them visible. It is taught that when the lens edge is ground at the disclosed angle, the external surface of the angled peripheral edge (and the outer peripheral rim) is concealed from the wearers vision by the inner peripheral rim. At the disclosed edge angle, the internal surface of the angled peripheral edge (and the outer peripheral rim) is also concealed from the wearer by the phenomenon of refraction, as their line of sight is 'bent' or refracted away from said internal surface. The included angle between the actual line of sight and the refracted line of sight creates a 'sector' or 'zone' invisible to the wearer. Thus, the concealment of both the internal and external edge surfaces occurs at the vertex that is the inner peripheral rim.

The sector of invisibility or invisible zone is defined as the area of view missing between a line of sight passing outside the inner peripheral rim, and a refracted line of sight within the lens, and beyond. In a two-dimensional view, as in FIG. 2 this may be described as an 'area' but in use in 3 dimensions, using, for example a circular lens, the sector is described as the volume of a partial cone-shaped void of image reaching the eye, bounded by the periphery of the inner peripheral rim on the outside, and on the inside by the refracted line of sight as it radially intersects with the outer surface of the lens around its periphery and near its edge. The invisible zone extends beyond the lens.

If the line of sight occurs at an incidental angle of 45 degrees to the inner lens surface, the deviation of that angle by refraction is approximately 18 degrees in polycarbonate. As the incidental angle becomes greater, for example 70 degrees, the amount of refraction increases to about 33 degrees. Thus, the included angle of the invisible zone becomes greater as the size of the lens increases.

Refraction within a lens causes images at its edge to seem to disappear, 'jump' or shift as the user's view transitions from through the lens to outside the lens' influence. This is the property of any lens, with an angled edge or not, whether framed or not. The 'shifting' of an image at the edge of a lens occurs almost always, in common usage, in the peripheral vision. In the case of an angled edge lens, if the scene being viewed is of a relatively uniform nature, such as a wall, ceiling, sky, sea, field of grass or forest, the effect of the 'shift' of image at the lens edge is unnoticeable. This is because the eye/brain interface tends to minimise attention to images in the peripheral vision and apportions nearly all emphasis to the direct, focussed vision perceived in the macula. Peripheral vision assists us to locate our position relative to objects in our environment, when we are in motion. In contrast direct vision provides vital information all the time. Only sudden changes, large objects, lights, shadows and movement in peripheral areas attract the attention of the brain, as they may constitute danger. The dominant eye accurately establishes when the head, and thus the rest of the body, are oriented straight ahead, necessary information for co-ordinated and safe movement. The focussed vision of both eyes works to calculate distance via binocular vision. Because these factors are so important the brain prioritises what is in the direct and focussed vision, while peripheral images lack detail and are comparatively ignored unless they constitute danger.

Accordingly, in embodiments, the angled edge builds on, and co-operates with, the tendency of the eye/brain interface to ignore peripheral vision, improving the ability to concentrate attention on focussed vision. This makes the lens of embodiments of the present invention extremely relaxing in use. The result is that in many circumstances wearers can forget they are wearing spectacles as no edge or reflections are visible and the 'shift' of images at the lens edge is minimised.

Embodiments of the present invention can be applied to fashion, prescription, reading spectacles and sunglasses. Herein, the terms glasses and spectacles are used interchangeably. The lenses can be clear, or they can be tinted. The lenses can be any shape including round, oval, square, rectangular, hexagonal, octagonal. In the case of tinted lenses, the tint may be faded near the edge of the lens, so the transition from a tinted view to one of normal brightness is graduated, not cut off sharply, thus less noticeable.

It should be understood that while spectacles are referred to herein as a use for the angled edge design, it is also applicable to a magnifying glass lens (hand-held or supported by a flexible arm) such as used by a jeweler, craftsman or hobbyist.

To effectively manufacture an angled edge lens, the starting point may be a lens already made to a customer's prescription and cut to the desired shape and size, including a small radius on the outer rim, but without an angled edge. Alternatively, the following steps in the machining process may be performed in one operation.

In order to produce an angled edge, the skilled person would use distances A and B, measured during an eye examination optionally as part of a spectacle fitting. A lens would then be prepared taking distances A and B into consideration. The lens can be prepared using existing lens machining equipment.

Distances A and B may be combined in a geometric program or algorithm to electronically calculate the desired optimum grinding angle for edge invisibility at all points of the lens periphery. Distance A represents the longitudinal measurement from the cornea, adjacent to the centre of the pupil, to any point on the outer peripheral rim of the lens. Distance B is the lateral measurement from the optical centre of the lens (where the gaze is straight ahead, depicted by axis S) to any point on the outer peripheral rim. Distance A may include a typical distance between a user's cornea and the centre of the pupil, for use in calculations. The distance between the eye surface and the lens inner surface, measured along axis S may also be used to calculate the desired edge angle.

The optical centre of the lens may be the mounting point for it on a rotating spindle when the angled lens edge is being machined. Both a machining cutter and the lens mounting spindle may adjust their positions in operation to achieve the desired lens shape and edge angle.

According to another aspect of the invention there is provided a method of producing an angled peripheral edge on an optically modified and cut to size lens with a conventional edge, for use in frame-less spectacles for a user having an eye with a line of sight along an axis S (S being straight ahead) which is about 0 degrees when the user is looking directly ahead, and peripheral lines of sight P, the method comprising the steps of:

measuring a distance A being a longitudinal measurement from the user's eye surface, adjacent to the centre of the pupil, to an outer peripheral rim of the lens; and measuring a distance B being a lateral measurement from an optical centre of the lens (axis S) to the outer peripheral rim; and placing a lens modified to a user's prescription and cut to a desired shape and having a conventional edge, and optionally a radiused outer peripheral rim in lens machining equipment; and modifying the lens's conventional edge to an angled peripheral edge joining the inner peripheral rim and the outer peripheral rim according to a program incorporating the distances A and distances B to result in a manufactured lens in which the angled peripheral edge angle is less than any lines of sight P, but greater than any lines of sight P1 refracted at the inner peripheral rim through the lens, allowing or causing the junction between the angled peripheral edge and the inner lens surface to be a cleanly machined vertex at the inner peripheral rim; and forming a radiused vertex at the outer peripheral rim.

Also provided herein is lens machining equipment for manufacturing a lens as described herein, the lens machining equipment comprising a pivoting spindle with a cutter to modify a lens edge, and a carrier to hold said lens, said spindle able to replicate a user's lines of sight P by pivoting through 360 degrees, the pivot point corresponding to the centre of a user's pupil on axis S; said carrier holding the lens, with it's optical centre at or near axis S, in a position corresponding to that of said lens on a user's face in use, relative to the eye, as measured during an eye examination and spectacle fitting; said equipment thus able to replicate the juxtaposition of a user's eye and a lens on a user's face during machining, the cutter being mechanically controlled by a feeler or guide, integral with the cutter, following the periphery of the lens outer rim to attain a desired edge angle, with fine adjustment of that angle, to allow for refraction of peripheral lines of sight at the cornea and a changing position of the pupil by natural eye movement, made by varying the distance of the lens to the pivot point during machining.

Also provided herein is lens machining equipment comprising a carrier for the lens, and a pivoting spindle with a cutter to modify a lens edge, the cutter being mechanically controlled by a feeler or guide, integral with the cutter.

Also provided herein is a method of using lens machining equipment for manufacturing a lens as described herein, the method comprising the steps of placing a pre-finished lens with a conventional edge into a carrier, said carrier holding the lens, with a lens optical centre at or near axis S, in a position corresponding to that of said lens on a user's face in use, relative to the eye, as measured during an eye examination and or spectacle fitting; said lens machining equipment thus able to replicate the juxtaposition of a user's eye and a lens on a user's face during machining;

applying a cutter mounted on a pivoting spindle to the lens edge, the spindle able to replicate a user's lines of sight P by pivoting through 360 degrees, a pivot point of the pivoting spindle corresponding to the centre of a user's pupil on axis S;

mechanically controlling the cutter by a feeler or guide, integral with the cutter, the feeler or guide causing the cutter to follow the periphery of the conventional lens outer rim to attain a desired peripheral edge angle, with fine adjustment of that angle, to allow for refraction of peripheral lines of sight at the cornea and a changing position of the pupil by natural eye movement, made by varying the distance of the lens to the pivot point during machining.

The cutter is mechanically guided by an integral 'feeler' or roller following the outer periphery of the otherwise finished lens, thus maintaining the desired angle around the entire lens edge according to the customer's actual facial measurements. Since light from peripheral angles enters the eye surface other than at axis S, the edge angle can accordingly be adjusted, or fine-tuned, by changing the relative position between the lens and the spindle pivot point.

The junction between the angled peripheral edge and the inner lens surface is a cleanly machined vertex at the inner peripheral rim. By cleanly machined vertex it is meant that there is no radius resulting from the manufacturing process. In cross-section, this junction would appear as a clean vertex (see FIG. 2 intersection between lines 12 and 22 at angle 18). The vertex at the outer peripheral rim is radiused or rounded as herein described to remove the sharp vertex. The radiused vertex can be seen in FIG. 2 at the intersection between lines 14 and 22 at point 20. The outer peripheral rim is by manufacture a sharp edge and, in embodiments will have a radiused finish for cosmetic, tactile and safety reasons. A minimal radius can be provided by machining or polishing and is of the minimum dimension required to blunt the edge sufficiently to prevent cutting a user's skin in use or handling. A large radius here compromises the invisible property of the lens. By contrast the inner peripheral rim must be a clean machined edge i.e., with no chamfer or radius. The inner peripheral rim can be said to be a vertex which is the point at which the inner lens surface and peripheral edge surface meet. This angular junction being cleanly machined and non-radiused is crucial to the lens design as any radius or blemish here allows extraneous reflections to be seen by a user.

The factors rendering the lens edge invisible all occur at the inner peripheral rim.

The angled edge must be ground essentially flat in relation to a radial line in all directions from the eye surface at axis S to the lens edge. A slightly concave or convex shape may be desirable to minimise reflections on the edge's external or external surfaces. Of course, the edge may be continuously curved in a peripheral direction. The angled edge occupies the entire thickness of the lens edge.

Polishing of the lens edge, if desired, must be by way of a relatively hard surface, such as a hard rubber roller with a fine polishing surface to avoid any rounding of the inner rim as would occur with a soft polishing medium. The polishing roller may follow the same contour as that of the lens edge cutter, following the same program as, and being interchangeable in fitting, with the machining cutter.

The main emphasis of the current invention is creating a rimless lens which conceals the entire perimeter of the lens edge from the peripheral view of a user in use.

There is an ideal angle for the lens edge to create invisibility of said edge for every combination of direct and peripheral vision of a user and any normal line of sight to any part of the modified lens. The present invention identifies and applies that angle to any part of a spectacle lens edge.

There is an optimal edge angle at any point of a lens periphery. This angle will vary from that bisecting the invisible zone, predominantly towards refracted lines of sight P1, to move the outer edge surface away from lines of sight P and minimise the use of lens material. The edge angle adjustment is weighted to favour invisibility at peripheral angles of sight with an eye oriented on axis S.

A wearer may incline their eyes toward a lens edge while wearing eyeglasses. They may look for an invisible lens edge using their direct vision. When this happens the angle from the pupil to the lens edge changes slightly. This is allowed for during machining by adjusting the edge angle.

If a user looks for the lens edge in their direct vision, they still cannot see it. None of the user's lines of sight can strike both the inner peripheral rim and outer peripheral rim at the same time in use (see FIG. 2). In reality it is difficult to maintain such an extreme angle of flex in the eyes as this exercise is tiring and disorienting. A user will seldom look for a lens edge. However, it is desirable that the lens edge should not be visible if they do so.

The angled edge lens creates a cosmetic problem in that when in use the modified edge appears to others as a ring of reflected light, though this is not seen by the wearer. When looking at the user there is a halo of light around the outside edge of the glasses more exaggerated than that of frame-less lenses of conventional design. This effect can be addressed by polishing the edge to make it more transparent. Alternatively, it can be coloured with a neutral hue such as grey or skin tone. Preferably, the edge can be painted with a clear or solid colour to complement the colour of the frame. For example, a transparent colour may be used to complement a frame with an anodised or metallic finish, a solid colour to complement a painted frame. The colour can be precision applied by a roller configured with same program as the grinding or polishing process. Paint may be specifically formulated to be compatible with or bond to a given lens material, for a durable finish. It may also be a dye. The colour may give the end-product an attractive and unique appearance and does not affect the users view as the lens edge is always within the invisible zone, whether painted or not. Since lenses of this design have not previously been available, a new market segment can be created; the design also appealing to customers comprising existing markets for conventional rimless or thinly rimmed spectacles. In addition, pre-worn rimless spectacles may be retro modified to incorporate the angled peripheral edge design.

The lens can be made from any material that lenses are typically made from including glass, plastic [CR39], polycarbonate or Trivex. Polycarbonate is by far the preferred material for frame-less lenses because of its combination of durability, light weight, good optical properties and cost. The art of manufacturing lenses is well developed, and the skilled person will appreciate that lenses are typically ground and polished or moulded to a desired shape prior to use. The shape/profile of the lens can be modified according to a user's prescription. The prescription can be obtained from an Optometrist who tests the user's eyes using a variety of eye testing techniques. Measurements A and B for calculating an angled edge may be obtained during a user's examination. Measurement can also be made of the vertical and horizontal angles of a lens on a user's face relative to a right-angled plane of axis S, to be replicated in lens modifying equipment or entered into a program to produce a desired edge angle.

The actual angle of the edge will depend upon the shape and size of a lens, and ideally will approximately bisect the included angle between lines of sight P and refracted lines of sight P1 (invisible sector). As a lens becomes bigger, peripheral lines of sight become more acute relative to a lens inner surface. This produces greater refraction in lines of sight and thus a wider invisible sector 24. At these greater lens widths, the edge angle can be varied from one bisecting the invisible sector to one closer to refracted lines of sight, thus using less lens material while maintaining edge invisibility.

EXAMPLE

In the Figures, the incident angle of line-of-sight P to the inner lens surface is about 45 degrees. The relative sizes of the eyeball and lens in FIG. 1 are intended to be somewhat to scale, but enlarged 33%. A human eyeball is about 24 mm diameter.

As a lens becomes bigger the incident angle of line of sight P becomes greater [more acute] relative to the inside lens surface 12. If a lens is 60 mm wide or wider, and wraps around a user's face, the incident angle may exceed 70 degrees.

The following is a table of typical lens sizes with corresponding incidence angles and resultant deviations lines of sight due to refraction. Note these are not angles of refraction but amounts by which lines of sight are bent by refraction. The numbers are approximate due to variable factors such as the angle of the lens on a user's face and distance from a user's eye, but are useful for comparison. The refractive index used is 1.59, which is that of polycarbonate. The refractive indices of plastic [CR39], Trivex and optical glass are fractionally different and adjustments during a lens making process may allow for such.

| Lens size | Incident angle | Deviation by refraction |
|-----------|----------------|-------------------------|
| 26 mm | 30 degrees | 11 degrees |
| 38 mm | 45 degrees | 18 degrees |
| 45 mm | 60 degrees | 26 degrees |
| 60 mm | 70 degrees | 33 degrees |

The angle by which a line of sight is bent by refraction is also the angle of the triangular invisible zone (FIG. 2).

As the numbers show, as a lens gets wider and the incident angle gets more extreme (acute), the invisible zone becomes wider, giving a larger field in which to dispose the angled peripheral edge. Conversely as a lens gets smaller, say incident angle 30 degrees there is only about 11 degrees within which to dispose the angled peripheral edge.

If a person looks toward the lens edge by flexing their eye, the slight change of incident angle tends to bring the outer surface of the lens 22A into view. Conversely if the user is gazing straight ahead or inclining their eye away from an angled lens edge, the inner surface 22B, will tend to come into view. Further complicating matters: spectacles can move around a bit on the face in use. For example, they can slip down the nose changing incident angles. Also, lines of sight as depicted in drawings as thin lines are illustrative only as real lines of sight are narrow beams, like torch beams, and the width of the pupil determines the width of the beam allowed into the eye, so multiple rays of light can enter at different angles. These factors combine to produce variations in lines of sight a situation making it undesirable to move the lens edge angle too close to P or P1, which may allow features of the lens edge to come into view. Accordingly, it is preferred if the lens angled peripheral edge bisects the invisible zone. It can be desirable for the angled peripheral edge to be disposed at least about 4 or 6 degrees away from either of lines of sight P or lines of sight P1 for optimum effect. Depending on the width of a lens, measured as distance B, the angle of the peripheral edge may be adjusted by between 1 and about 12 degrees from the bisection angle.

At 30 degrees incident angle the lens edge could be varied through a range of about 3 degrees total, or 1.5 in either direction from its central bisection position in the invisible zone. At 45 degrees incident angle the lens edge could be varied through a range of about 10 degrees total, or 5 in either direction from its central bisection position in the invisible zone. At 60 degrees incident angle the lens edge could be varied through a range of about 18 degrees total, or 9 in either direction from its central bisection position in the invisible zone. At 70 degrees incident angle the lens edge could be varied through a range of about 24 degrees total, or 12 in either direction from its central bisection position in the invisible zone.

BRIEF DESCRIPTION OF THE FIGURES

Embodiments of the invention will now be described with reference to the accompanying drawings which are only approximately drawn to scale and which are exemplary only and in which.

Figures 1, 2:
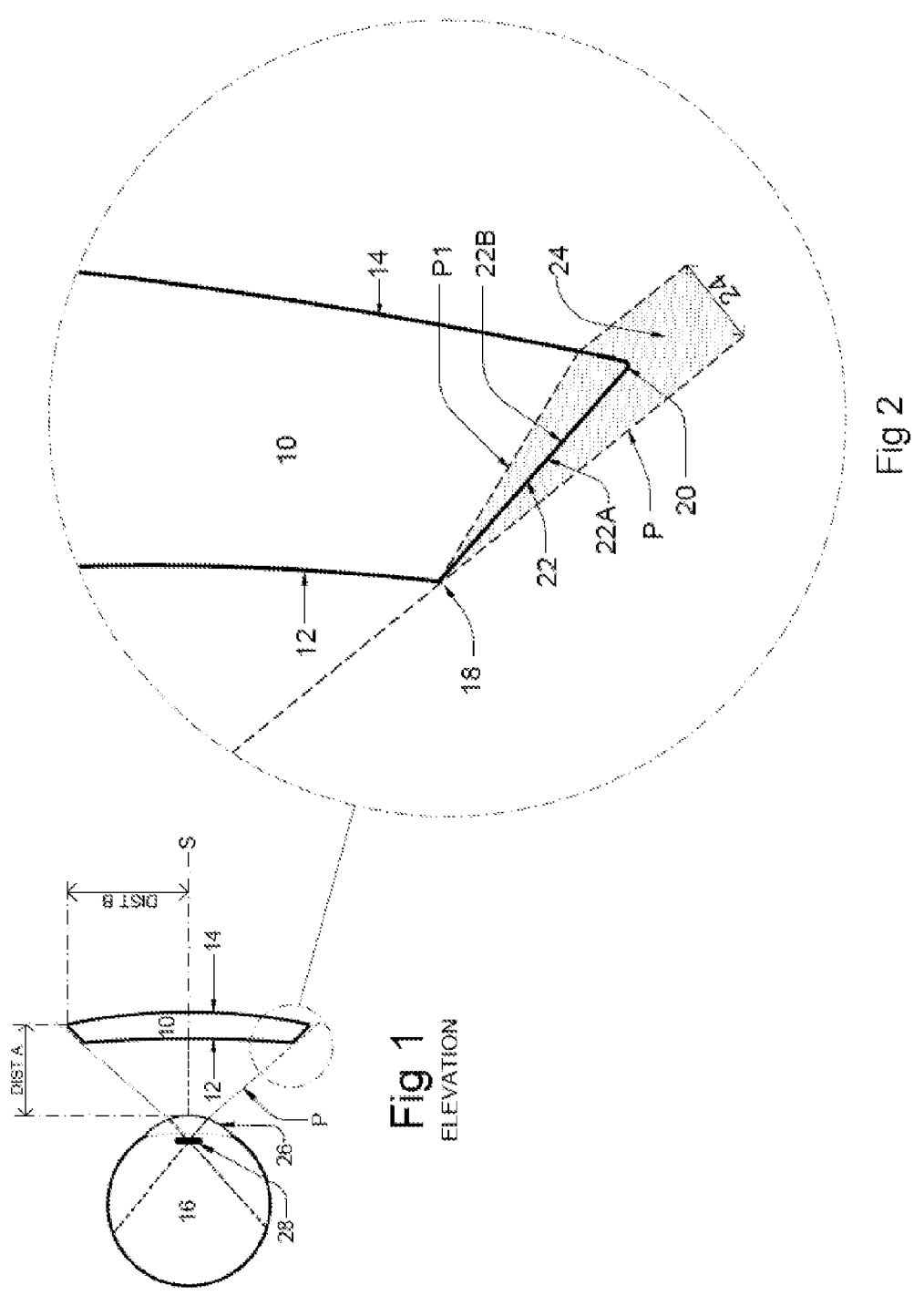
FIG. 1 is an elevation view of a cross section through the centre of an eye and the optical centre of a lens showing their relative positions.
FIG. 2 is an enlarged view of a part of the lens of FIG. 1 showing details of various aspects.

DETAILED DESCRIPTION OF EMBODIMENTS
OF THE INVENTION

The lens 10 can be for any use. In an embodiment, the lens 10 is usable in frame-less spectacles. The user of the lens has an eye 16 as shown in FIG. 1 with a line of sight along an axis S (S being straight ahead) which is about 0 degrees when the user is looking directly ahead, and peripheral lines of sight P.

The lens 10 has a lens body which is the natural volume of the lens 10. The lens 10 has an inner surface 12 that would be closest to the eye 16 in use. The lens has an outer surface 14 opposing the inner surface 12. The inner surface 12 can be described as concave, while the outer surface 14 can be described as convex. The overall effect is a curved lens 10 typical of those used in e.g. spectacles. In an embodiment, the lens 10 is not curved, or the curves are equivalent for a neutral optical effect, although this is not typical in eyeglasses which are intended to modify vision. All surfaces can be modified with surface treatments such as anti-glare, non-reflective, scratch resistance, UV filters, other.

The inner surface 12 has an inner peripheral rim 18. The outer surface 14 of lens 10 has an outer peripheral rim 20. There is an essentially flat angled peripheral edge 22 joining the inner peripheral rim 18 and the outer peripheral rim 20. The angled peripheral edge 22 has an internal surface 22B inside the lens body 10. The angled peripheral edge 22 has an external surface 22A defining an outer dimension of the lens body 10.

The inner peripheral rim 18 is a clean edge, not chamfered, rounded, radiused or otherwise modified. Accordingly, the inner peripheral rim 18 is defined by a vertex formed between the inner lens surface 12 and the angled peripheral edge surface 22. The outer peripheral rim 20 is the outer boundary of the lens material. The outer peripheral rim 20 is minimally rounded or radiused.

As shown in FIG. 1, a distance can be measured from the outer peripheral rim 20 to the surface of the cornea of the eye 16 adjacent to the pupil (distance A). Note, this is not a distance of the lens surface 12 from the surface of the eye 16, but a distance of the outer peripheral rim 20 to the surface of the eye 16, measured in a longitudinal orientation as shown.

A distance can be measured from the outer peripheral rim 20 to axis S (distance B) (refer FIG. 1). Distance B can vary according to the size of the lens with larger lenses having a larger distance B. The size of the lens may be varied according to the chosen style of lens.

In an embodiment the angle of the angled peripheral edge surface 22 is based on the angle of a line drawn from a point on the cornea surface corresponding to the centre of the pupil, on axis S, to the edge of the lens 10. This point is a constant factor and is the starting point for calculations. At peripheral angles of sight, light enters the cornea at points other than that corresponding to axis S so the angle required to attain total invisibility is continuously variable. The edge angle is calculated by a geometric equation using distances A and B, since they determine the points at which peripheral lines of sight enter the cornea, and thus the variations of those points from that at axis S. Distances A and B are not constant and the edge angle is not likely to be the same at any two points on the lens edge periphery. Existing equipment used to manufacture the lenses can be programmed to machine the lens at the continuously variable angle based on distances A and B.

Alternatively, in another embodiment the aforementioned angle may be attained by a mechanical connection between a cutter of lens modifying equipment and a 'feeler' or guide following the outer peripheral rim 20. In this case the pivot point for the edge cutter is equivalent to the centre of a user's pupil. Fine tuning of the edge angle is accomplished by varying distance A between the cutter and the lens during machining.

In FIG. 2, an invisible zone 24 can be seen created between the lines of sight P that pass the inner peripheral rim 18, and the lines of sight P1 refracted at the inner peripheral rim 18 through the lens body 10. As shown, the angled peripheral edge 22 is disposed completely within the invisible zone 24. By disposed completely, it is meant that no part of the angled peripheral edge 22 is outside of the bounds of the invisible zone 24. As shown in FIG. 2, the angled peripheral edge 22 can in some embodiments bisect the invisible zone. By bisect, it is meant that when viewed in cross-section, the angle of the invisible zone at the inner rim 18 is approximately divided into two substantially equal portions.

The angled peripheral edge 22 can be machined at any angle so long as it is within the bounds of the invisible zone 24. Any lines of sight P that pass the inner peripheral rim 18 do not strike the external surface 22A of the angled peripheral edge nor the outer peripheral rim 18; and refracted lines of sight P1 within the lens body 10 do not strike the internal surface 22B of the angled peripheral edge 22, such that the internal surface 22B and external surface 22A of the angled peripheral edge 22 and outer peripheral rim 20 are not visible to the user in use.

In FIG. 2, the angle of the peripheral edge 22 of the lens 10 is shown as less than the aforementioned lines of sight P. In embodiments, this is to prevent the external surface 22A of the lens edge 22 becoming visible when the eyeball rotates in its socket, not normally more than about 30 degrees from straight ahead. This movement of the eye 16 in the socket slightly changes the angle of the line of sight from the pupil to the lens edge 22. The internal surface 22B of the lens edge 22 is rendered invisible by the phenomenon of refraction, which is harnessed at the inner rim to create the 'sector of invisibility', or invisible zone 24. The sector of invisibility 24 is described as the angle between the refracted lines of sight P1 and the actual lines of sight P.

The body of lens 10 has the following features:

an inner lens surface 12 closest to the eye, having an inner peripheral rim 18; and an outer lens surface 14 bounded by an outer peripheral rim 20, an angled peripheral edge 22 joining the inner peripheral rim 18 and outer peripheral rim 18, the angled peripheral edge 22 having an internal surface 22B inside the lens body 10 and an external surface 22A defining an outside of the lens body 10;

wherein a junction between the angled peripheral edge 22 and the inner lens surface 12 forms a cleanly machined vertex at the inner peripheral rim 18; and wherein a junction of the angled peripheral edge 22 and the outer lens surface 14 forms a vertex sufficiently radiused to remove a sharp machined edge at the outer peripheral rim 20;

an invisible zone 24 created between the lines of sight P that pass the inner peripheral rim 18, and the lines of sight P1 refracted at the inner peripheral rim 18 through the lens 10, characterized that in use the angled peripheral edge 22 is disposed completely within the invisible zone 24 such that any lines of sight P that pass the inner peripheral rim 18 do not strike the external surface 14 of the angled peripheral edge 22 nor the outer peripheral rim 18; and lines of sight P1, refracted within the lens body 10, do not strike the internal surface 22B of the angled peripheral edge 22, such that the internal surface 22B and external surface 22A of the angled peripheral edge 22 and outer peripheral rim 20 are not visible to the user in use.

The method disclosed herein is a method of producing an angled peripheral edge 22 on an optically modified and cut to size lens for use in frame-less spectacles for a user having an eye 16 with a line of sight along an axis S (S being straight ahead) which is about 0 degrees when the user is looking directly ahead, and peripheral lines of sight P. The method disclosed comprises the steps of:

measuring a distance A being a longitudinal measurement from the user's eye surface, adjacent to the centre of the pupil, to the outer peripheral rim of the lens; and calculating a distance B being a lateral measurement from an optical centre of the lens (axis S) to the outer peripheral rim;

shaping the conventional peripheral edge to become an angled edge joining the inner peripheral rim 18 and outer peripheral rim 20 using the distances A and distances B in an algorithm to result in a manufactured lens 10 in which the angled peripheral edge 22 angle is less than any lines of sight P, but greater than any lines of sight P1 refracted at the inner peripheral rim 18 through the manufactured lens 10, allowing or causing the junction between the angled peripheral edge 22 and the inner lens surface 12 to be a cleanly machined vertex at the inner peripheral rim 18; and forming a radiused vertex at the outer peripheral rim 20.

It will of course be realised that while the foregoing has been given by way of illustrative example of this invention, all such and other modifications and variations thereto as would be apparent to persons skilled in the art are deemed to fall within the broad scope and ambit of this invention as is herein set forth.

It is to be understood that, if any prior art publication is referred to herein, such reference does not constitute an admission that the publication forms a part of the common general knowledge in the art, in Australia or any other country.

Where there is any conflict with content herein when compared to any document incorporated herein, the present specification in its form at the time of the assessment takes precedence unless the context makes clear otherwise.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Any promises made in the present description should be understood to relate to some embodiments of the invention and are not intended to be promises made about the invention as a whole. Where there are promises that are deemed to apply to all embodiments of the invention, the applicant/patentee reserves the right to later delete them from the description and does not rely on these promises for the acceptance or subsequent grant of a patent in any country.

The invention claimed is:

1. A lens for use in frame-less spectacles for a user having an eye with a line of sight along an axis S (S being straight ahead) which is about 0 degrees when the user is looking directly ahead, and peripheral lines of sight P, the lens comprising a lens body of lens material, the lens body comprising:

an inner, concave lens surface closest to the eye, having an inner peripheral rim, and an outer, convex lens surface bounded by an outer peripheral rim;

an essentially flat, angled peripheral edge joining the inner and outer peripheral rims, the angled peripheral edge having an internal surface inside the lens body and an external surface defining an outside of the lens body, wherein a junction between the angled peripheral edge and the inner lens surface forms a cleanly machined vertex at the inner peripheral rim, and a junction of the angled peripheral edge and the outer lens surface forms a vertex sufficiently radiused to remove a sharp edge at the outer peripheral rim;

an invisible zone created between lines of sight P that pass the inner peripheral rim, and lines of sight P1 refracted at the inner peripheral rim through the lens material;

wherein the angled peripheral edge is disposed completely within the invisible zone such that any lines of sight P that pass the inner peripheral rim do not strike the external surface of the angled peripheral edge nor the outer peripheral rim, and refracted lines of sight P1 within the lens body do not strike the internal surface of the angled peripheral edge nor the outer peripheral rim, such that the internal surface and external surface of the angled peripheral edge and the outer peripheral rim are not visible to the user in use.

2. The lens according to claim 1 wherein, an entire periphery of the angled peripheral edge is disposed completely within the invisible zone, causing an entire periphery of the lens edge to be invisible to the user.

3. The lens according to claim 1, wherein:

distance A represents a longitudinal measurement from a user's eye surface, adjacent to a center of the pupil, to any point on the outer peripheral rim of the lens;

distance B is a lateral measurement from an optical center of the lens (axis S) to any point on the outer peripheral rim; and the angle of the angled peripheral lens edge is calculated by a program using the varying measurements for distances A and B and, with a line, parallel to axis S, forming a reference point as it meets the outer peripheral rim, the line representing zero degrees of edge angle.

4. The lens according to claim 1, wherein the external surface of the angled peripheral edge is modified with a colored material.

5. The lens according to claim 1, wherein the lens is selected from a shape in a group consisting of: circular, oval, square, rectangular, pentagonal, hexagonal, and octagonal.

6. The lens according to claim 1, wherein any surface is modified with a treatment selected from anti-glare, nonreflective, scratch-resistant, or ultraviolet (UV) filter.

7. A method of producing an angled edge lens as claimed in claim 1 using lens machining equipment with a lens carrier and a proximal lens edge cutter on a pivoting spindle able to pivot through 360 degrees to replicate a user's peripheral lines of sight, the method comprising:

mounting a lens, optically modified to a user's prescription, cut to a desired size and shape, on a carrier with the lens optical center aligned on a common axis with the spindle pivot point, the axis representing axis S and said pivot point representing the center of a user's pupil, with the lens thus mounted in a position replicating that of the lens on a user's face relative to a user's eye, as measured during a spectacle fitting;

applying the pivoting cutter to the lens edge, mechanically guided by an integral feeler or guide following the lens periphery, or by a computer program, simulating angles of a user's peripheral lines of sight to a lens edge during machining, causing the cutter to produce a peripheral angled edge which is disposed within an invisible zone between peripheral lines of sight at a lens inner rim and peripheral lines of sight refracted at an inner peripheral rim, with fine adjustment of the edge angle, to allow for refraction of peripheral lines of sight at a user's cornea and changing positions of the pupil by natural eye movement, made by varying the distance between the lens and the cutter pivot point during machining.

8. A rimless magnifying glass lens in accordance with claim 1.

9. A pair of glasses comprising lenses made by the method of claim 7.

10. A rimless magnifying glass lens in accordance with claim 2.

11. A rimless magnifying glass lens in accordance with claim 3.

12. A rimless magnifying glass lens in accordance with claim 4.

13. A rimless magnifying glass lens in accordance with claim 6.

14. A method of producing an angled peripheral edge on an optically modified lens, cut to a desired size and shape and for use in frame-less spectacles for a user having an eye with a line of sight along an axis S (S being straight ahead) which is about O degrees when the user is looking directly ahead, and peripheral lines of sight P, the method comprising:

entering a distance A, being a longitudinal measurement from the user's eye surface, adjacent to the center of the pupil, to points on an outer peripheral rim of the lens, into a computer program; and entering a distance B, being a lateral measurement from an optical center of the lens (axis S) to points on the outer peripheral rim, into the computer program;

placing a lens optically modified to a user's prescription, cut to a desired size and shape, and having an inner concave lens surface bounded by an inner peripheral rim, and an outer convex lens surface bounded by an outer peripheral rim, in lens making equipment;

modifying an edge of the lens to become an angled peripheral edge joining the inner peripheral rim and the outer peripheral rim according to the computer program incorporating the distance A and distance B to result in a manufactured lens in which the angled peripheral edge angle is less than any lines of sight P, but greater than any lines of sight P1 refracted at the inner peripheral rim through the lens; and causing a junction between the angled peripheral edge and the inner lens surface to form a cleanly machined vertex at the inner peripheral rim, and a function of the angled peripheral edge and the outer lens surface to form a vertex sufficiently radiused to remove a sharp edge at the outer peripheral rim, wherein an invisible zone is created between lines of sight P that pass the inner peripheral rim, and lines of sight P1 refracted at the inner peripheral rim through the lens material;

wherein the angled peripheral edge is disposed completely within the invisible zone such that any lines of sight P that pass the inner peripheral rim do not strike the external surface of the angled peripheral edge nor the outer peripheral rim, and refracted lines of sight P1 within the lens body do not strike the internal surface of the angled peripheral edge nor the outer peripheral rim, such that the internal surface and external surface of the angled peripheral edge and the outer peripheral rim are not visible to the user in use.

15. The method of claim 14, wherein an entire periphery of the lens is modified by the method to be invisible to the user.

16. The method according to claim 14, wherein the method further comprises modifying the external surface of the angled peripheral edge with a colored material.

17. The method according to claim 14, wherein the method further comprises modifying any surface with a treatment selected from anti-glare, non-reflective, scratch-resistant, or ultraviolet (UV) filter.

18. The method according to claim 14, further comprising programming lens making equipment with a geometric algorithm based on distance A, with adjustments based on distance B factored in to allow for variations in the location of the intersection of peripheral lines of sight P with the cornea when the gaze is straight ahead, and variations in the position of the pupil due to natural eye movement, to produce a lens with a continuously variable edge angle around the entire periphery, that is always between lines of sight P, passing the inner peripheral rim, and lines of sight P1 refracted at the rim.

19. A lens prepared by the method of claim 14.

20. A pair of glasses comprising lenses made by the method of claim 14.

* * * * *